United States Patent [19]
Yellowley et al.

[11] Patent Number: 5,519,602
[45] Date of Patent: May 21, 1996

[54] MULTIPLE SLAVE CONTROL

[75] Inventors: Ian Yellowley, West Vancouver; Ramin Ardekani; Rudolf J. Seethaler, both of Vancouver, all of Canada

[73] Assignee: The University of British Columbia, Vancouver, Canada

[21] Appl. No.: 100,810

[22] Filed: Aug. 2, 1993

[51] Int. Cl.[6] ..................................................... G05B 13/00
[52] U.S. Cl. ...................................... 364/132; 364/474.11
[58] Field of Search ................................... 364/131, 132, 364/133, 134, 135, 136, 148, 149, 153, 151, 152, 474.3, 474.31, 474.21, 474.24, 474.11; 318/573, 595, 625, 626

[56] References Cited

U.S. PATENT DOCUMENTS

| | | | |
|---|---|---|---|
| 4,748,554 | 5/1988 | Gebauer et al. | 364/153 X |
| 4,878,002 | 10/1989 | Heatzig et al. | 364/148 X |
| 5,007,006 | 4/1991 | Taylor et al. | 364/167.01 X |
| 5,095,417 | 3/1992 | Hagiwara et al. | 364/138 |
| 5,218,281 | 6/1994 | Sasaki et al. | 318/600 |
| 5,218,549 | 6/1993 | Kokura et al. | 318/573 X |
| 5,222,017 | 6/1993 | Yellowley et al. | 164/132 |
| 5,241,250 | 8/1993 | Nagasawa et al. | 318/573 X |
| 5,268,898 | 12/1993 | Kazato | 370/85.6 |
| 5,363,026 | 11/1994 | Currat | 318/573 X |

*Primary Examiner*—Roy N. Envall, Jr.
*Assistant Examiner*—Brian C. Oakes
*Attorney, Agent, or Firm*—C. A. Rowley

[57] ABSTRACT

A multi-operation control system is made up of a plurality of slave computers at least some of which are axis computers each monitoring its respective operation and receiving instructions broken down into plurality of discreet actions. The current state $S_{c,N}$ of each slave is determined and is compared with preset absolute maximum status for that slave $S_{ab,N(max)}$ and the maximum acceptable change in status $\delta S_{a,N(max)}$ of each respective slave is determined and the corresponding appropriate state signal based on the maximum acceptable change to that slave is sent to all of the slaves in the system. Each axis slave then reads all state signals and determines the highest state signal acceptable to all slaves and each axis slave then carries out its correspond increment(s) of change in status $\delta S_N$ based on the highest $S_{a,N(max)}$ acceptable to all slaves.

14 Claims, 2 Drawing Sheets

MULTIPLE SLAVE CONTROL

FIELD OF THE INVENTION

The present invention relates to a multi-operation control system. More particularly the present invention relates to a multi-operation control system where controlled to operate at the maximum rate of change acceptable to all control elements.

BACKGROUND OF THE PRESENT INVENTION

The control of individual operations of multi-operational systems such as a robot or machine tool by adding set increments of action (i.e. movement, velocity, etc.) for each action to obtain desired action per unit time of each controlled element is known. In general the tasks to be carried out at each controlled axis are divided into a series of discrete positions or steps and the commands passed to the axis controls at a constant rate. In some systems this procedure, normally called interpolation, is carried out in two stages by defining the series of positions for all axes and then fine stage interpolation is carried out at each axis control and coordination of the axes is maintained to ensure the desired path of action is attained. It is also known to compare the desired action of a given axis with the actual action at that point in time and the difference between these two, used to determine a multiplication factor that is applied to control this axis. The greater the difference, the greater multiplication factor applied to adjust that axis thereby causing the slower axis to operate more rapidly to catch up to the faster axes. With this control system, each individual axis is self-regulated but the overall control of the system may not remain synchronized.

U.S. Pat. No. 5,222,017 issued Jun. 22, 1993 Yellowley et al. describes a control system for synchronizing slaves (slave computers each controlling an axis of a multi-operation system) using synchronizing pulses sent simultaneously to all the slaves in the system to time their operations and ensure that all the slaves remain in a preselected relationship by only adding increments of change to each slave when all of the slaves attain their then current desired operating state.

The system described in the Yellowley et al. patent is an effective control for multiple slave operations to ensure they retain their synchronization (relative relationship by operating the overall system on the basis of the slowest operating parameter with no means for increasing the operating rate when all slaves are operating below their maximum acceptable levels.

BRIEF DESCRIPTION OF THE PRESENT INVENTION

It is the object of the present invention to provide a control system for regulating the operation of plurality of slaves based on actual operating conditions to obtain operation at a maximum level acceptable to all slaves in the system.

Further object of the present invention is to provide a system where the operating action of the slaves of the multi-operating system may be reversed to retract an end point manipulated by the slaves along its advancing path, for example, in a welding or shaping operation the welder or shaping tool may automatically be retracted along its advancing path.

Broadly, the present invention relates to a multi-operation control system or method of controlling multi-operation system incorporating a plurality of slaves at least some of which are axis slaves comprising defining a plurality of discreet allowable status changes ($\delta S_N$) for each said slave which each respective slave is intended to attain in the a preset interval ($\delta t$), determining the current status ($S_{c,N}$) of each said slave, comparing said current status ($S_{c,N}$) for each said slave with its respective preset absolute maximum value ($S_{ab,N}$) and defining the maximum. acceptable change in status ($\delta S_{a,N(max)}$) for each said slave, each said slave transmitting a state signal indicative of its respective said maximum acceptable change in state ($\delta S_{a,N(max)}$) to all said slaves in said system, monitoring state signals transmitted by all said slaves at each of said axis slaves in said system, determining the state signal indicating the maximum acceptable change in status ($\delta S_{a,N(max)}$) transmitted by all of said slaves and implementing a change status ($\delta S_N$) at each said axis slave based on said maximum acceptable change in status ($\delta S_{a,N(max)}$) signal transmitted by all said slaves.

Preferably, said maximum acceptable change in status ($\delta S_{a,N(max)}$) will include negative changes in state to cause reversal of all said axis slaves and retraction of an end point manipulated by said axis slaves along its previously advancing path of travel.

Preferably, each of said state signals indicating a different level of the acceptable change in status ($\delta S_{a,N}$) will be delivered to each of said slaves on a separate state line.

Preferably said status changes will correspond with changes in velocity ($\delta V_N$) of each respective axis slave.

Preferably, there will be at least three positive changes of status ($\delta S_a$) for each said slave.

BRIEF DESCRIPTION OF THE DRAWINGS

Further features, objects and advantages will be evident from the following detailed description of the preferred embodiments of the present invention taken in conjunction with the accompanying drawings in which.

DESCRIPTION OF THE PREFERRED EMBODIMENTS

Before describing the present invention the terms Master computer, coordinating computer, technical slave and axis slave as used herein will be defined. A master computer controls the operation of one or more systems. A synchronizing or coordinating computer synchronizes the tech and axis slaves of a system. A technical or tech slave is a computer or monitoring means that monitors an operation or condition in the overall system and sends signals based on the monitored condition to the other computers in the system. An axis slave is a slave computer that implements a specific action or movement in the system (e.g. movement along an axis) and monitors the action (the axis) it controls to determine whether it is carrying out its respective action at its selected rate. A single computer may function as one or more of a master computer(s), coordinating computer(s), technical slave(s) of axis slave(s), however they have been schematically indicated as separate entities in the disclosure for clarity. It will also be apparent the coordinating computer may, in some arrangements, take the form of an internal clock or synchronized internal clocks.

The system of the present invention is an improvement over the system described in the above referred to Yellowley et al. patent application, the contents of which are incorporated herein by reference. However, the present invention permits a significant improvement in operation over that obtainable using the original system as described in the said Yellowley et al. application.

Figure 1:
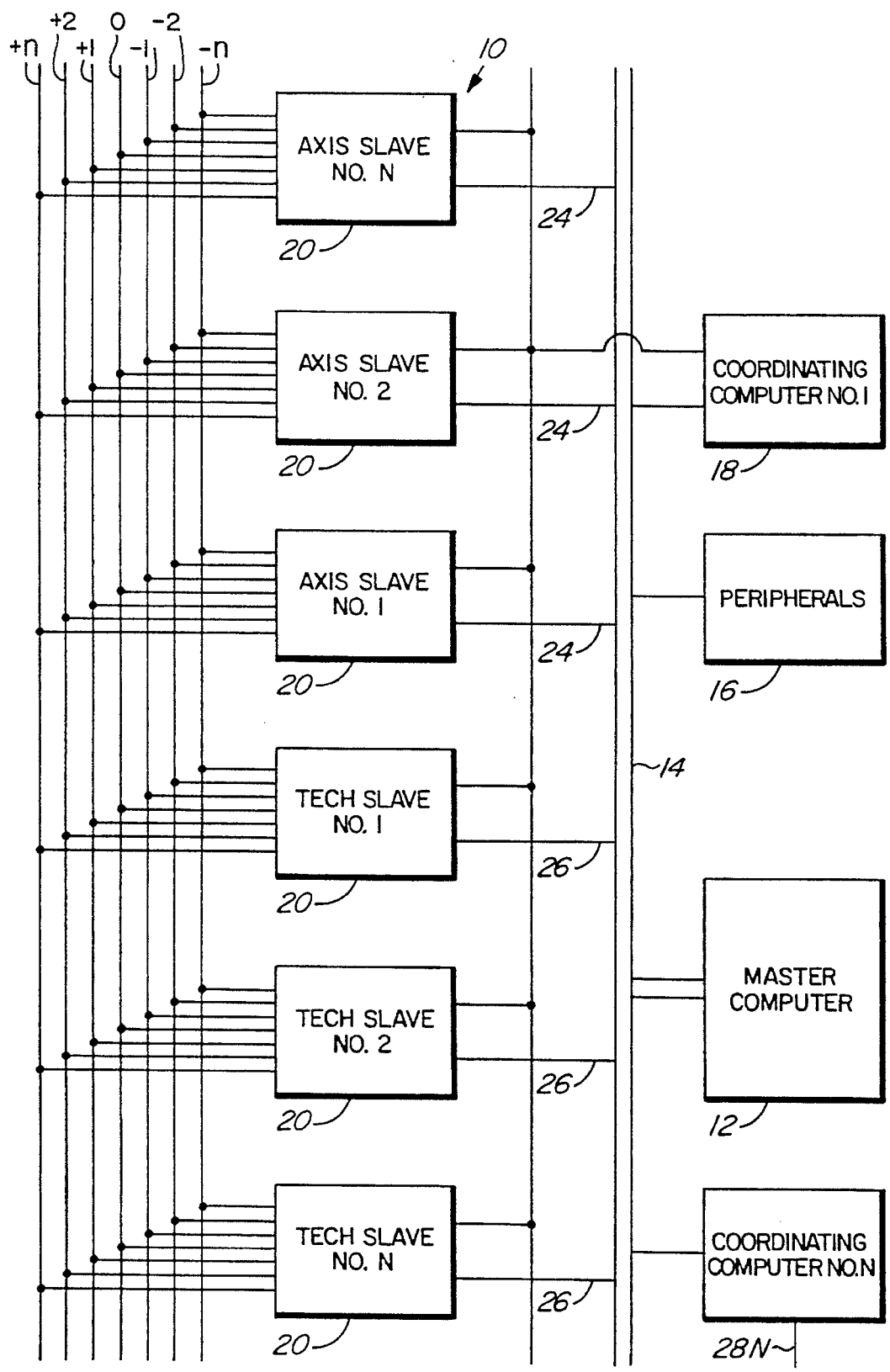
FIG. 1 is a schematic arrangement of a system including a plurality of slaves including axis slave computers and master coordinating computer based on the invention.

As shown in FIG. 1, the system 10 is composed of a master computer 12 that feeds information via the main line or bus 14, to all of the computers in the system. In the illustrated arrangement, only one operating system has been shown in detail with a second represented solely by a second coordinating computer number N. The particular system shown in FIG. 1 includes peripherals 6 and a coordinating computer 18 which has been designated as coordinating computer no. 1 to indicate that it is controlling the no. 1 operating system controlled by the master computer 12 and that other coordinating computers may be controlled by the master computer 12.

The system 10 includes a plurality of axis slave computers 20 and plurality of technical slave computers 22. The axis slave computers 20 have been designated as axis slaves no. 1, 2-N and the technical slave computers or the like 22 as technical slaves no. 1, 2-N to indicate that there may be any reasonable selected number of axis slave computers 20 or technical slave computers 22 in an operation system such as the system 10.

As described in the Yellowley et al. patent referred to above, the master computer 12, in the schematically illustrated arrangement, sends instructions to each of the slave computers 20 and 22 via lines 24 and 26 respectively leading from the bus 14 to the computers 20 and 22 respectively.

The coordinating computer 18 feeds a second line 28 and is connected to each of the slaves 20 and 22 and provides synchronizing pulses thereto to keep all of the slaves synchronized.

The illustrated arrangement shows 7 status lines but, it will be apparent, the number of status line may be adjusted as required in accordance with a particular system to be installed. In the illustrated arrangement there are three negative status lines indicated as −1, −2 and −n, three positive status lines indicated at +1, +2 and +n and a neutral status line 0.

Interpolation may be carried out in master computer 12 or the commands from the master computer 12 may be broken down (splined) so that each increment transmitted from the master 12 is splined into plurality of discreet segments in each of the slave computers so that the action of axis slave computer no. 1 in a first time period $\delta t_1$ would be $\delta X_1$ and axis computer no 2 would be $\delta Y_1$, etc. and in the corresponding $n^{th}$ time period $\delta X_n$, $\delta Y_n$, etc. so that the actions of the axis slave computers are each broken down into a plurality of discreet increments (which obviously will normally be different for each axis). Normally the technical slaves are not required to spline the parameter values passed from the master 12.

All the computers that are monitoring parameters in the system, i.e., each of the axis slave computers and the technical slave computers are provided (generally by the master computer 12) with an absolute maximum value of the parameters whose status they are monitoring. A relationship which indicates which statuses (as represented by the state lines) are admissible based on the current status and the maximum allowable status (or status change) of each of these parameters as coded on each of these respective slave processors, for example by instructions from the master computer 12.

One way for the system to signal acceptable status is to activate each state line the monitoring slave deems acceptable by sending a positive signal (selected high voltage) to all state lines indicating acceptable status changes while all others (not acceptable) are at zero potential. These signals are ANDED, thus, when the slaves read the state lines to determine the status acceptable to all slaves it reads an accumulated signal strength based on the ANDING of the discrete signals from the slaves. If the ANDED signal on a given line is not up to the predetermined value, the status upgraded by that line is deemed not acceptable by each slave and the highest state line with an acceptable signal (predetermined value) is found all of the slaves act on the status indicated by that state line. Such an ANDING system may be achieved in hardware easily and economically.

For example, if one of the technical slaves is assigned to monitor the force acting upon a cutting tool, it will be supplied with the absolute maximum value of the cutting force during any particular time period from the master 12. The slave will also be programmed to allow it on each cycle to raise all admissible state lines to a high level. In the situation where the force is at or near its maximum allowable level, this would lead the technical slave to raise all state lines from the most negative state line to a positive state line +1 to signal an acceptable status change up to that represented by state line +1, for example, as above indicated by raising these lines a high voltage level. Should however, the force be over its maximum level, then only negative or zero state lines will be activated indicating that the status change (velocity along the path) will be forced to slow down by this one processor. On the other hand should the force be much below its maximum allowable value, then the technical slave will set several of the positive state lines, for example +1, +2 up to +n to the high voltage, in addition to the zero and negative lines thereby signalling its willingness to accept a higher status (velocity) along the programmed path. It should be evident that in most cases there will not be a simple linear relationship between the status variable in this case force, and the allowable instantaneous status change (velocity) as indicated by the state lines signalling acceptance of the status change, thus, the need for the relationship to be coded within each slave processor.

Obviously, each slave must monitor all state lines and have the capacity to activate all state lines to signal acceptance of the status change. The sense of each state line in the current scheme as above indicated represents the ANDING of the signals from each slave. In the case where the difference between the current status and maximum allowable status of a parameter monitored by one of the slaves allows a large positive status increment this will be translated by the internal relationship within the slave to the allowance of an increased status change which for the purposes of this example is velocity. The slave as described earlier will then set or drive all state lines up to the maximum allowable state line, (say mth state line) to the positive value i.e. lines −n, −1, 0, +1, +2 . . . +m. Should all other slaves with access to the state lines also admit such a change, and thus, drive all lines up to +m to the high voltage (acceptable signal), then on the succeeding closing of the axis control loops the increments transmitted to each axis slave loop will correspond to the sum of the next m increments in the path of the particular axis. It will be seen that in the case of a constant velocity path the continued assertion of these levels will increase the velocity after several cycles to m times the originally programmed velocity. In the case where one particular processor however, is not able to allow such a change and only for instance drives the negative and zero state lines to the high voltage, the ANDING of the signals on each state line will result in only negative and the zero line being admissible, in this case then, on the succeeding closing of the axis loops the increment sent to all such axis loops will be zero and should the condition continue for several cycles the axes will reduce their velocity to zero.

The timing of the system above indicated is coordinated by the coordinating computer 18 which may itself be an axis slave, or by an internal clock to allow each slave to read from and write to the state lines at appropriate intervals. It should be realized that the frequency of transmission of state line information and the related loop closing is much higher than the bandwidth of the axis drives, thus allowing modulation of axis velocity without chattering.

In the normal situation using the system as described to this point, all slaves will select the highest allowable state line as that which determines their action in the following closing of the axis loops. In those exceptional cases where no state line is deemed allowable then the slaves are programmed to accept the zero line only.

Figure 2:
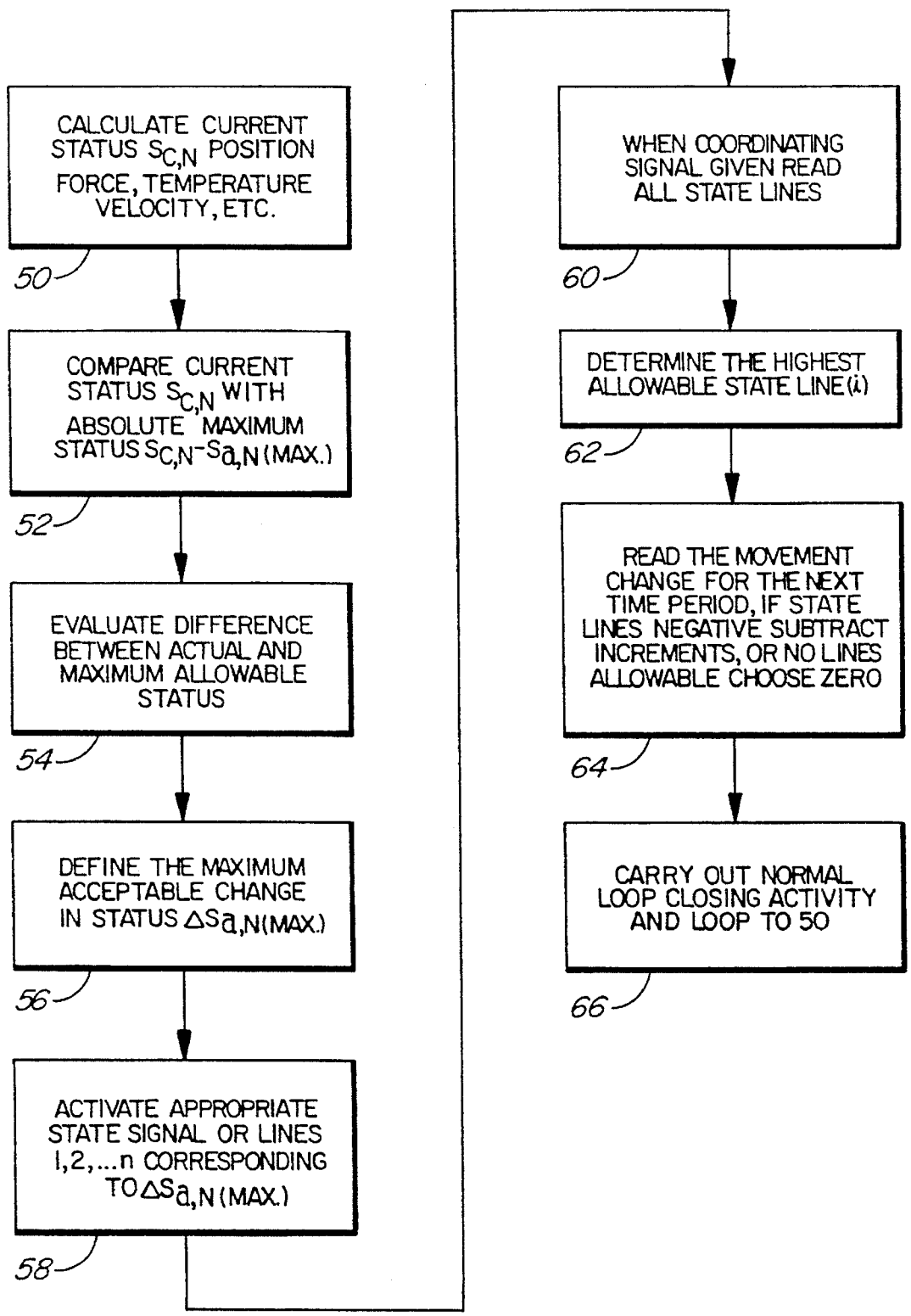
FIG. 2 is a schematic flow diagram illustrating the preferred mode of operation of the present invention.

The above described system has been shown schematically in FIG. 2 which describes the operation of each of the slaves.

As shown, each of the slaves first calculates its current status $S_{c,N}$ which may be related to position, force, temperature, velocity, or other physical parameter which is important to the task be processed as indicated at 50.

The current status $S_{c,N}$ is compared with the absolute maximum status $S_{ab,N(max)}$ for that particular slave ($S_{ab,N(max)}$ is based on pre-programmed information supplied by the master computer 12 to each of the slaves) as indicated at 52 to determine the difference $\delta S_N$ between the current status $S_{c,N}$ and the absolute maximum status $S_{ab,N(max)}$ as indicated at 54.

The difference $dS_N$, the current status, and in some cases measurements of other relevant parameters are used, in conjunction with at a coded relationship at each of the slaves, to determine the range of allowable state lines, ($-n \ldots -2, -1, 0, 1, 2, \ldots n$), which should in the normal case as indicated previously be driven to a high potential by each particular slave, as indicated at 56. Each slave then drives all admissible lines to a high level, the ANDING of the lines will result in only those lines which are deemed admissible to all slaves remaining at a high level as shown at 58.

Each slave then, on receipt of a coordinating signal, reads all lines and selects the highest available as indicated at 60, (should no lines be high then zeroth line is chosen), the value of the highest line, (i) is chosen to determine the increment of motion to be sent to each axis. As described at 64, the originally programmed increment will be sent should (i) be 1, whilst the next two programmed increments will be sent if (i) is 2. It will be realised that the scheme is then capable of allowing either an increase or a decrease in path velocity over that programmed.

Finally, each axis slave will perform its axis control duties and the technical slaves will perform their monitoring activities as indicated at 66. While each axis slave will perform all activities during each cycle, it is possible that some technical slaves will require a greater period of time to ascertain status and may then only drive the state lines once per several cycles of the axis slaves or coordinating unit.

The scheme described allows the system to operate at the maximum speed acceptable to all slaves. Moreover, in the exceptional case where no levels are acceptable, the system will come to a complete halt. The latter condition may be used to advantage by a particular processor which is examining for process breakdown such as tool breakage. Such a processor may then drive all state lines low ensuring the stopping of the process, regardless of the state of the remaining tasks. There are some exceptional cases where it may however, be preferred to reverse the tool or end effector and have it move backwards along its previously traced path (such a motion will allow easy refitting or replacement of damaged tools, etc.). This behaviour may be achieved within the current system by adding an exception state line at a negative value (say −1), which is OR'd with the standard state line at the same level (in this case −1), under normal circumstances, where no exception occurs, the exception processor would drive all lines except the additional line to a high level, the result is then unaffected by the exception processor. In case of an exception however, the exception processor drives only the additional line high. In this case, the only line remaining high will be the original state line which corresponds to the exception state line, guaranteeing in this case that the value selected is (−1), i.e. the end effector will retrace its path at the same velocity as was originally programmed. Means will be provided to terminate such a motion after a predetermined number of steps or spans corresponding to geometric elements transmitted from the master have been traversed. Clearly, also an alarm will be generated to inform the operator of the problem. Operator will still have the possibility of overriding and stopping or slowing feed manually.

All the above operations are carried out in real time to provide a smoothly operated accurate multi-operation controlled in part by the operating conditions that the system is sharing.

Having described the invention, modifications will be evident to those skilled in the art without departing from the scope of the invention as defined in the appended claims.

We claim:

1. A multi-operation control system incorporating a plurality of slaves at least some of which are axis slaves, said control system comprising input means for defining for each said axis slave a plurality of allowable status changes ($\delta S_N$) which it is intended to attain in a preset working interval ($\delta t$), said input means defining an absolute maximum value ($S_{ab,N}$) for each slave, each said slave having means for determining its current status ($S_{c,N}$), means comparing its said current status ($S_{c,N}$) with its absolute maximum value ($S_{ab,N}$) and means for defining maximum acceptable change in status ($\delta S_{a,N(max)}$), state line means interconnecting said slaves, each said slave including means for transmitting a state signal as a potential applied to said state line means indicative of its respective said maximum acceptable change in status ($\delta S_{a,N(max)}$) to all said slaves in said system via said state line means, each said axis slave having means for monitoring said state signals transmitted by all said slaves and means for determining the state signal indicating the maximum acceptable change in status ($\delta S_{a,N(max)}$) acceptable to all of said slaves, said means for determining including ANDING means ANDING said potentials on said state line means corresponding to each said allowable status change and means for implementing a change in status ($\delta S_N$) at each said axis slave based on said maximum acceptable change in status ($\delta S_{a,N(max)}$) signal acceptable to all said slaves.

2. A system as defined in claim 1 wherein said change in status ($\delta S_{ab,N(max)}$) includes changes in status to cause reversal of all said axis slaves and retraction of an end point manipulated by said axis slaves along its previously advancing path of travel.

3. A system as defined in claim 2 wherein at least three of said line represent changes of status ($\delta S_a$) for each said slave.

4. A system as defined in claim 1 wherein at least three of said state lines represent changes of status ($\delta S_a$) for each said slave.

5. A method of controlling multi-operation system incorporating a plurality of slaves at least some of which are axis slaves comprising defining for each of said axis slaves a plurality of acceptable status changes ($\delta S_N$) which it is intended to attain in the preset interval ($\delta t$), defining an absolute maximum acceptable value ($S_{ab,N}$) for each slave, each said slave determining its current status ($S_{c,N}$), comparing its said current status ($S_{c,N}$) with its absolute maximum value ($S_{ab,N}$) and defining its maximum acceptable change in status ($\delta S_{a,N(max)}$)$_2$ each said slave transmitting a state signal indicative of its said maximum acceptable change in status ($\delta S_{a,N(max)}$) to all said slaves in said system, each state signal indicating a different level of acceptable change in status being transmitted as a potential on a separate state line, monitoring said state signals transmitted by all said axis slaves at each of said axis slaves in said system, determining the state signal indicating the maximum acceptable change in status ($\delta S_{a,N(max)}$) acceptable to all of said slaves by ANDING said potentials applied in each said state line to provide an ANDED potential for each said state line and implementing a change in status ($\delta S_N$) at each said axis slave based on said maximum acceptable change in status ($\delta S_{a,N(max)}$) signal acceptable to all said slaves as defined by said ANDED potential for the state line representing said maximum acceptable to all said slaves having a preset value.

6. A method as defined in claim 5 wherein said maximum acceptable change in status ($\delta S_{a,N(max)}$) includes changes in state to cause reversal of all said axis slaves and retraction of an end point manipulated by axis slaves along its previously advancing path of travel.

7. A method as defined in claim 6 wherein at least three positive changes of status ($\delta S_a$) are provided for each said slave.

8. A method as defined in claim 7 whereto when an exceptional situation is detected said status signals are set at a selected desired value until said system receives a signal indicating said exceptional situation is not detected.

9. A method as defined in claim 5 wherein at least three changes of status ($\delta S_a$) are provided for each said slave.

10. A method as defined in claim 9 wherein when an exceptional situation is detected said status signals are set at a selected desired value until said system receives a signal indicating said exceptional situation not detected.

11. A method as defined in claim 6 wherein said status changes represent velocity changes.

12. A method as defined in claim 5 wherein when an exceptional situation is detected said status signals are set at a selected desired value until said system receives a signal indicating said exceptional situation not detected.

13. A method as defined in claim 6 wherein when an exceptional situation is detected said status signals are set at a selected desired value until said system receives a signal indicating said exceptional situation not detected.

14. A method as defined in claim 5 wherein said status changes represent velocity changes.

* * * * *